July 20, 1948.   H. T. RIGHTS ET AL   2,445,455
ELECTRICAL MICROMETER GAUGE
Filed Dec. 5, 1941
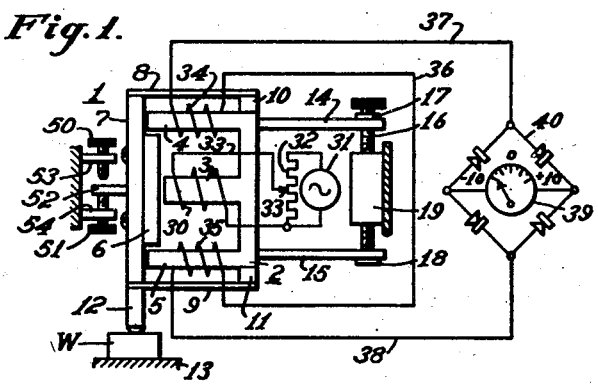
Fig. 1.
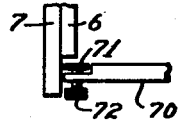
Fig. 4.
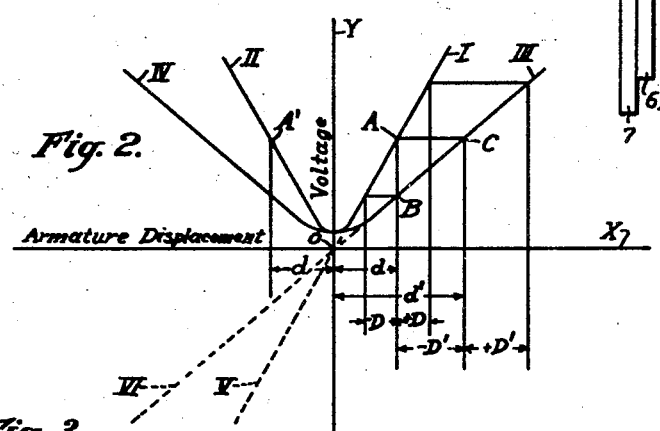
Fig. 2.
Fig. 5.
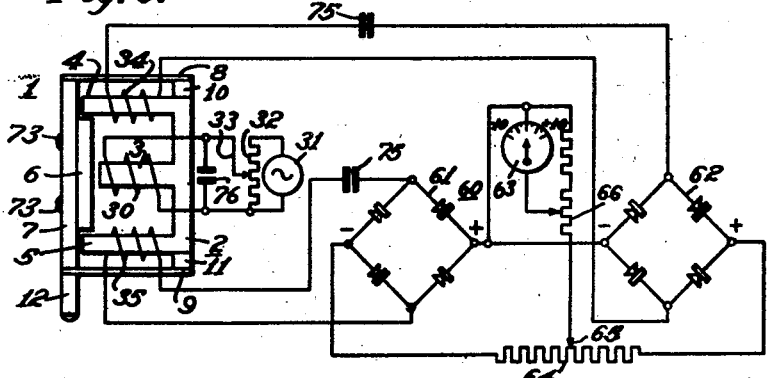
Fig. 3.
WITNESSES:
Edward Michaels
C. L. Freedman
INVENTORS
Herbert T. Rights &
Hershel Toomin.
ATTORNEY Patented July 20, 1948

2,445,455

UNITED STATES PATENT OFFICE 2,445,455

ELECTRICAL MICROMETER GAUGE

Herbert T. Rights, Verona, and Hershel Toomim, Newark, N. J., assignors to Westinghouse Electric Corporation, East Pittsburgh, Pa., a corporation of Pennsylvania Application December 5, 1941, Serial No. 421,850

3 Claims. (Cl. 177—351)

This invention relates to electrically operated measuring devices, and it has particular relation to electrical gauges or micrometers.

Prior art electrical gauges employ a magnetic member or armature which is movable for varying air gaps in a pair of magnetic paths. The magnetic armature is so disposed that in a predetermined position thereof the magnetic reluctances of the magnetic paths are equal. Movement of the magnetic armature away from the predetermined position thereof serves to increase the reluctance of one of the magnetic paths and to decrease the reluctance of the remaining magnetic path. The relationship between armature displacement and the reluctances may be termed a gauge characteristic. A suitable measuring instrument, which may be energized through a barrier-layer rectifier of the copper-oxide type, is provided for measuring the unbalance of the reluctances of the magnetic paths. Such a measurement indicates the degree of movement of the magnetic armature.

In a prior art gauge, equal movement of the magnetic armature in either of two directions from its aforesaid predetermined position produces the same deflection of the measuring instrument. Consequently, inspection of the measuring instrument fails to reveal the exact position of the magnetic armature. To eliminate this ambiguity, it is customary to provide the magnetic armature with stops which restrict movement of the magnetic armature to a predetermined side of its aforesaid predetermined position. Although the stops serve to eliminate the ambiguity, they restrict appreciably the effective range of movement of the magnetic armature for predetermined air gaps. Consequently, efficient utilization of air gaps is not obtained.

It is desirable that electrical gauges have a linear characteristic. In prior art gauges, particularly of the type employing barrier-type rectifiers, the characteristic may depart appreciably from linearity for movement of the magnetic armature adjacent its aforesaid predetermined position. The departure from linearity is objectionable because of the difficulties imposed in calibrating measuring instruments associated with the electrical gauges. Furthermore, the departure is in such a direction as to decrease the sensitivity of the gauge over part of its range of operation. For these reasons it is customary to adjust the stops associated with the magnetic armature to eliminate that portion of the movement of the magnetic armature which results in a non-linear measurement. Such adjustment of the stops further restricts the useful range of movement of the magnetic armature for given air gaps.

Stops adjusted as above indicated introduce considerable inconvenience in the operation of an electrical gauge. This inconvenience is particularly pronounced when it is desired to change the sensitivity of the electrical gauge. When the sensitivity of an electrical gauge is to be modified, it is necessary to readjust the stops in order to calibrate the electrical gauge for a different range of operation. Since the readjustment of the stops must be determined experimentally each time the sensitivity is changed, considerable time is lost in making the necessary adjustments.

In accordance with the invention, an electrical gauge is provided which has a linear characteristic over the entire range of movement of its magnetic armature. In a specific embodiment of the invention, a pair of voltages are obtained which are controlled, respectively, by the reluctances of the two magnetic paths provided in the electrical gauge. These voltages are employed for differentially energizing a measuring instrument. When the magnetic armature is in its aforesaid predetermined position, the two voltages are substantially equal, and an indicating member of the measuring instrument occupies an intermediate position. Movement of the magnetic armature in either direction away from its predetermined position results in a corresponding movement of the indicating member of the measuring instrument. Consequently, substantially the entire range of movement of the magnetic armature may be employed for measuring purposes.

More specifically, one embodiment of the invention contemplates that the aforesaid voltages are alternating voltages. A separate rectifier is provided for energization by each of the voltages. The outputs of the rectifiers are connected with opposite polarity to a measuring instrument which conveniently may be of the center-zero, permanent-magnet, moving-coil type. Consequently, the direction of movement of the indicating member associated with the measuring instrument is dependent upon the polarity of the difference in current outputs of the two rectifiers.

With connections as set forth in the preceding paragraph, substantial currents flow through the rectifiers for all positions of the magnetic armature. For this reason, a substantially linear characteristic is obtained wherein movements of the indicating member of the measuring instrument are substantially proportional to displacement of the magnetic armature. Such operation is particularly desirable for rectifiers, such as the copper-oxide rectifier, wherein the resistance of the rectifier varies as a function of current density therein.

For any sensitivity of the instrument, zero energization of the measuring instrument occurs when the movable magnetic member is substantially in its predetermined position. Consequently, much of the laborious readjustment of stops required for each change in sensitivity of the instrument is eliminated.

It is, therefore, an object of the invention to provide an improved electrical gauge.

It is a further object of the invention to provide an electrical gauge having an elongated linear characteristic.

It is an additional object of the invention to provide an electrical gauge employing rectifiers having resistances which vary as a function of current therethrough with means for maintaining a substantial flow of current therethrough under all conditions of operation.

It is also an object of the invention to provide an electrical gauge having high efficiency.

It is another object of the invention to provide an electrical gauge for measuring movement of a magnetic armature in an air gap wherein means are provided for measuring such movement substantially over the full dimension of the air gap.

It is a still further object of the invention to provide an electrical gauge having a pair of voltage outputs which vary, respectively, directly and inversely with movement of a gauge member, and which are equal for an intermediate position of the gauge member, with measuring means differentially responsive to the voltage outputs over the entire range of movement of the gauge member.

It is still another object of the invention to provide an electrical gauge having a pair of voltage outputs which are equal for a predetermined position of a movable gauge member and which vary, respectively, directly and inversely with movement of said gauge member on opposite sides of the predetermined position, with measuring means energized from said voltage outputs and responsive to the direction of movement of the gauge member from its predetermined position.

Other objects of the invention will be apparent from the following description taken in conjunction with the accompanying drawing, in which:

Figure 1 is a schematic view of an electrical gauge device;

Fig. 2 is a graphic representation on Cartesian co-ordinates showing voltage output of an electric gauge plotted as ordinates and armature displacement of the electrical gauge plotted as abscissae;

Fig. 3 is a schematic view of an electrical gauge device embodying the invention;

Fig. 4 is a detail view in elevation showing a modification of the electrical gauge devices of Figs. 1 and 3; and Fig. 5 is a view in front elevation of magnetic armatures suitable for the gauge devices of Figs. 1 and 3.

Referring to the drawings, Figure 1 shows an electrical gauge device which includes a gauge head 1. This gauge head is provided with an E-shaped magnetic core 2 having a centrally disposed leg 3 and outer magnetic legs 4 and 5. A magnetic armature 6 is positioned adjacent the centrally disposed leg 3 for movement between the outer legs 4 and 5 of the magnetic core 2. By inspection of Fig. 1, it will be observed that movement of the magnetic armature 6 serves to vary simultaneously in reverse directions air gaps between the magnetic armature 6 and each of the legs 4 and 5. Consequently, movement of the armature serves to vary the reluctances of two magnetic paths, one of which includes the outer leg 4, and the second of which includes the outer leg 5 of the magnetic core. Both of these magnetic paths include as a common portion the centrally disposed leg 3 of the magnetic core. Preferably the core 2 and the armature 6 are formed of magnetic material preferably having high electrical resistivity, such as silicon steel or a material similar to that disclosed in United States Patent No. 1,807,021 and marketed under the trade-name "Hipernik." The magnetic material may be laminated or it may be employed in solid section form.

The magnetic armature 6 is mounted on a supporting member 7 which conveniently may be formed of a non-magnetic material, such as brass. Movement of the magnetic armature is confined to a path determined by two leaf springs 8 and 9 which also may be formed of brass or any suitable material. One end of each of the springs 8 and 9 is rigidly attached to the supporting member 7 in any suitable manner. The remaining ends of the springs are attached, respectively, to spacers 10 and 11 which, in turn, are attached to the magnetic core 2.

Flexure of the springs 8 and 9 permits movement of the magnetic armature 6 to vary the air gaps between the magnetic armature and the legs 4 and 5. Such movement may be determined by a gauge pin 12 which is attached to the supporting member 7. The gauge pin 12 may be positioned above a fixed table or platen 13. Work W to be measured may be positioned on the platen 13 beneath the pin 12. The position of the magnetic armature 6 with respect to the magnetic core 2 is then determined by the dimensions of the work to be measured.

Adjustment of the gauge head 1 with respect to the platen 13 may be effected in any desired manner. For purposes of illustration, the magnetic core 2 may be provided with a pair of projecting arms 14 and 15. These arms carry a screw 16 which is provided with flanges 17 and 18 to prevent axial movement of the screw with respect to the magnetic core 2. The magnetic screw is in threaded engagement with an elongated nut 19 which is mounted on a support fixed with reference to the platen 13. Consequently, rotation of the screw 16 serves to raise or lower the gauge head 1 with respect to the platen 13.

Since movements of the magnetic armature 6 modify the reluctances of the magnetic paths including respectively, the legs 4 and 5, the resulting change in the reluctances may be employed to indicate the degree of movement of the magnetic armature. For this purpose the centrally disposed leg 3 is surrounded by a winding 30 which is energized from a source of alternating current 31. Preferably the source of alternating current 31 is a constant voltage source. To permit variation of the voltage applied to the winding 30, a potentiometer 32 may be interposed between the source 31 and the winding 30. By operation of a movable tap 33, the voltage applied to the winding 30 may be varied, if desired.

Alternating current flowing through the winding 30 produces an alternating magnetic flux in the leg 3. When the magnetic armature 6 is mid-way between the legs 4 and 5, the alternating magnetic flux divides equally between the legs 4 and 5. Movement of the magnetic armature 6 from this mid-position increases the reluctance of one of the magnetic paths and decreases that of the remaining magnetic path. These changes in reluctance are accompanied by a corresponding change in the magnetic fluxes in the legs 4 and 5. Therefore, the changes in magnetic fluxes in the legs 4 and 5 correspond to the displacement of the movable armature 6.

For measuring the variations in magnetic fluxes passing through the legs 4 and 5, windings 34 and 35 are positioned, respectively, about the legs. Each of the windings 34 or 35 will have an alternating voltage induced therein which is dependent upon the magnitude of magnetic flux passing through the associated leg of the magnetic core 2. The windings 34 and 35 are connected in opposition in a series circuit by means of conductors 36, 37, and 38. Consequently, when the voltage induced in the windings 34 and 35 are equal, no current flows in the series circuit. If the windings 34 and 35 have equal numbers of turns, equal voltages will be induced therein when the magnetic armature 6 is positioned mid-way between the legs 4 and 5 of the magnetic core 2. When the magnetic armature 6 is displaced from this mid-position, the voltages induced in the windings 34 and 35 are not equal, and the resulting difference in voltages produces a current in the series circuit. This current may be measured by a suitable measuring instrument connected between the conductors 37 and 38.

In the specific embodiment illustrated in Fig. 1, the measuring instrument may take the form of a conventional permanent magnet, moving coil instrument 39 which is sometimes referred to as a D'Arsonval instrument, and which has excellent sensitivity. Since the instrument 39 is a direct-current instrument, a suitable rectifier 40 is connected between the instrument 39 and the conductors 37 and 38 to convert the alternating current flowing in the conductors 37 and 38 into direct current for energizing the instrument. Although any suitable rectifier may be employed, the rectifier 40 conveniently may be a barrier-layer rectifier such as a copper-oxide rectifier. Such copper-oxide rectifiers may be connected in the familiar bridge form illustrated in Fig. 1 for providing full-wave rectification of the alternating current.

As previously explained, the characteristic of the gauge device illustrated in Fig. 1 is not linear. In order to restrict movement of the magnetic armature 6 to a range assuring linear operation of the gauge device, a pair of adjustable stops 50 and 51 may be positioned to engage a lug 52 carried by the supporting member 7. The adjusting screws 50 may be in threaded engagement with arms 53 and 54 carried by a stationary support. By suitable manipulation of the adjusting screws 50 and 51, movement of the magnetic armature 6 may be restricted to any desired range.

The operation of the gauge device illustrated in Fig. 1 may be understood more fully by reference to the graphic represenation of Fig. 2. In Fig. 2 the voltage applied to the measuring instrument 39 is plotted as ordinates against the displacement of the magnetic armature 6 as abscissae. In Fig. 2, the reference axes Y and X intersect at a point 0 which corresponds to that position of the magnetic armature 6 mid-way between the legs 4 and 5. The characteristic of the gauge device illustrated in Fig. 1 is represented in Fig. 2 by the full line curve I—II.

By inspection of the curve I—II, it will be observed that for a displacement of the magnetic armature 6 in one direction from its mid-point, which will be assumed to be an upward direction, as viewed in Fig. 1, for a distance d, the voltage applied to the measuring instrument has a value corresponding to the point A in Fig. 2. However, it will be noted that the curve I—II is substantially symmetrical about the Y axis. For this reason, a displacement of the magnetic armature 6 in a downward direction (as viewed in Fig. 1) for a distance —d results in the application of a voltage corresponding to the point A' to the measuring instrument 39 which is equal to the voltage corresponding to the point A. Consequently, inspection of the measuring instrument 39 would not indicate which of the distances, d or —d, is responsible for the measuring instrument indication.

To avoid such ambiguities, the stop screws 50 and 51 are adjusted to restrict movement of the magnetic armature 6 to one side only of its mid-point position. For the purpose of discussion, it will be assumed that the stops are adjusted to permit movement of the armature 6 from its mid-point position only in an upward direction. For such an adjustment, only that portion of the curve I—II which lies on the right of the axis Y is employed.

By inspection of Fig. 2, it will be observed further that the curve I—II departs from linearity adjacent the axis Y. This departure from linearity, which is caused principally by the variation of the resistance of the rectifier with respect to current, renders the calibration of the measuring instrument 39 somewhat more difficult. Moreover, the departure from linearity is in such a direction that the gauge device is relatively insensitive in the region of curvature. For these reasons, the stops 50 and 51 preferably are so adjusted that the magnetic armature 6 is capable of movement only in the range assuring a linear voltage output.

In operation a reference block having a standard dimension is positioned upon the platen 13. The gauge head 1 then is manipulated by operation of the screw 16 until with the pin 12 in engagement with the reference block, the indicating pointer of the measuring instrument 39 is at a predetermined point on the scale, such as the zero point. It will be assumed that the voltage necessary to move the pointer to the zero position corresponds to the voltage represented by the point A in Fig. 2.

With the zero position of the gauge head determined, the stops 50 and 51 are manipulated to provide an adequate range of movement. This range of movement is represented in Fig. 2 by the distances —D and +D. In other words, the point A serves as a reference point for operation of the gauge device. Voltage outputs above that represented by the point A indicate that work positioned beneath the pin 12 is oversize. Conversely, a voltage output having a value less than that represented by the point A indicates that work positioned beneath the pin 12 is smaller than standard.

By inspection of Fig. 2 it will be observed that the range of useful motion of the magnetic armature 6 is a small proportion of the movement permitted by the gaps between the armature and the legs 4 and 5. Consequently, efficient utilization of these gaps is not obtained.

It sometimes is desirable to change the sensitivity of the gauge device from that represented by the curve I—II in Fig. 2 to that represented by a new curve, such as the curve III—IV of Fig. 2. Such a change in sensitivity may be effected, for example, by decreasing the voltage applied to the winding 30. This decrease is obtained by proper adjustment of the movable tap 33 with respect to the potentiometer 32. When such a change in sensitivity is effected, it becomes necessary to readjust the gauge head stops. The necessity for the adjustment of the various stops may be understood from a brief discussion of Fig. 2.

When the sensitivity corresponds to the curve III—IV a deflection of the magnetic armature having a value $d$ produces a voltage equal to that represented by the point B on the curve III—IV. This voltage is not sufficient to actuate the pointer of the measuring instrument 39 to the zero point on its scale. Consequently, the gauge head must be adjusted to provide a deflection $d'$ which produces a voltage corresponding to the point C on curve III—IV. Since this voltage is equal to that represented by the point A, the pointer of the measuring instrument 39 indicates the correct value. At the same time, the stops 50 and 51 must be adjusted to correct the range of movement of the magnetic armature 6. This range of movement is indicated in Fig. 2 by the distances $-D'$ and $+D'$. Consequently, the armature 6 has a maximum movement of $-D'$ and $+D'$ with respect to its reference position, as represented by the point C.

Since the adjustment of the gauge head 1 is obtained by a trial and error method, substantial time is lost whenever the sensitivity of the gauge device is altered. For this reason, it is desirable that the gauge device of Fig. 1 be modified to provide characteristics represented by the straight lines I—V and III—VI of Fig. 2. The extensions V and VI of the straight portions of the curves I and III are shown dotted in Fig. 2. By inspection of Fig. 2, it will be observed that the straight lines I—V and III—VI intersect at the point 0. Consequently, if the point 0 represents a standard dimension, a change from the sensitivity represented by the straight line I—V to that represented by the straight line III—VI necessitates no adjustment to correct the reading of the measuring instrument associated with the gauge device. These desirable characteristics are inherent in the gauge device represented in Fig. 3.

In Fig. 3 the gauge head 1 is associated with a measuring unit 60 for differentially measuring the energizations of the windings 34 and 35 over the entire range of movement of the magnetic armature 6 through the air gaps between the armature 6 and the legs 4 and 5 of the magnetic core. As the armature 6 moves from a position adjacent the leg 5 to a position adjacent the leg 4 of the magnetic core, the voltage produced in the winding 35 decreases from a maximum to a minimum value. At the same time the voltage induced in the winding 34 increases from a minimum to a maximum value. The voltages induced in the windings 34 and 35 are equal when the magnetic armature 6 is in a position midway between the legs 4 and 5. For a movement of the magnetic armature 6 from a position adjacent the leg 4 to a position adjacent the leg 5, reverse variations in induced voltages are obtained for the windings 34 and 35. Consequently, if the measuring unit 60 is responsive differentially to the outputs of the windings 34 and 35, the instrument will indicate at all times the exact position of the magnetic armature 6.

The measuring unit 60 may include rectifiers 61 and 62 having their output terminals connected, respectively, to the windings 35 and 34. These rectifiers may be of any desired construction, but for the purpose of illustration they are assumed to be barrier-layer rectifiers such as copper-oxide rectifiers. These rectifiers are arranged in the familiar bridge form for full wave rectification. Although filters may be employed with the rectifiers herein disclosed for removing ripples from the outputs of the rectifiers, such filters generally are not required.

For measuring the difference or unbalance of the currents flowing in the rectifiers 61 and 62, a measuring instrument 63 is provided which may be of the permanent-magnet, moving-coil type, sometimes referred to as a D'Arsonval instrument. This instrument is of the center-zero type wherein the direction of movement of the indicating element or pointer is dependent upon the polarity of energization of the instrument. The output terminals of the rectifiers 61 and 62 are connected in opposite polarity relationship to the instrument 63. The polarity relations of the output terminals of the rectifiers are illustrated clearly in Fig. 3 by negative (—) and positive (+) markings.

Assuming that the magnetic armature is positioned mid-way between the legs 4 and 5, that the windings 34 and 35 have equal numbers of turns and that the rectifiers 61 and 62 are balanced, equal currents flow through the rectifiers 61 and 62, and no difference current flows through the measuring instrument 63. Consequently, the indicating element or pointer of the measuring element 63 is at a mid-position represented by the zero marking of its scale in Fig. 3.

If the magnetic armature 6 is deflected upwardly, as viewed in Fig. 3, the voltage induced in the winding 34 increases and that induced in the winding 35 decreases. As a result of these variations, current flowing through the rectifier 62 is substantially larger than that flowing through the rectifier 61, and a difference or unbalance current flows through the measuring instrument 63. This difference or unbalance current is of such a polarity that it urges the indicating element or pointer of the measuring instrument in a predetermined direction which will be assumed to be clockwise, as viewed in Fig. 3. Such movement of the pointer indicates oversize of the work being measured.

If the magnetic armature 6 moves from its midpoint position in a downward direction, as viewed in Fig. 3, the voltage induced in the winding 34 decreases and the voltage induced in the winding 35 increases. Consequently, a larger current flows through the rectifier 61 than that through the rectifier 62. The resulting difference or unbalance current flows through the measuring instrument 63 in such a direction as to urge the pointer in a counterclockwise direction to indicate undersize of the work being measured. In other words, the direction of movement of the pointer from its mid-position is a function of the polarity of the energization of the instrument 63, and the magnitude of such movement is a function of the magnitude of the energization.

Since the rectifiers may be slightly unbalanced inherently, the measuring instrument 63 may be connected thereto through a resistor 64. By adjusting a movable tap 65 connecting the measuring instrument to the resistor 64, any inequality between the rectifiers or associated elements may be balanced.

The characteristics of the gauge device illustrated in Fig. 3 is similar to that represented by the straight line I—V in Fig. 2. This clearly indicates that the entire range of movement of the magnetic armature 6 with respect to the magnetic core 2 may be utilized for measuring purposes.

If a change in sensitivity of the gauge device shown in Fig. 3 is desired, such a change may be effected by varying the voltage applied to the winding 30 in the manner discussed with reference to Fig. 1. Alternatively, the variation in sensitivity may be effected by varying the sensitivity of the measuring instrument 63. As shown in Fig. 3, this may be effected by connecting the measuring instrument 63 across a variable potentiometer or resistor 66 which is across the output terminals of the rectifiers. By varying the instrument connection to the resistor 66, the proportion of current flowing through the measuring instrument 63 may be modified as desired. The resistor 66 preferably has a restricted range of adjustment to maintain a reasonably constant resultant resistance across the rectifier terminals.

It should be observed that a variation in sensitivity of the gauge device shown in Fig. 3 merely rotates the characteristic represented by the straight line I—V about the point 0 of Fig. 2 to a new position such as that represented by the dotted straight line III—VI. Since the zero position of the pointer of the measuring instrument 63 corresponds to the point 0 in Fig. 2, and since this point is unaffected by variations in sensitivity of the gauge device, no adjustment need be made to correct this reading for changes in sensitivity. This greatly simplifies and expedites the operation of the gauge device.

Although a specific calibration is indicated on the drawing for the measuring instrument, it is to be understood that the instrument may be calibrated in other ways. For example, the scale may be calibrated to read directly the dimension of the work positioned beneath the pin 12.

With the connections illustrated in Fig. 3, the copper-oxide rectifiers carry currents which assure substantial current densities therein at all times. This contributes appreciably to the linearity of the characteristic curves for the gauge shown in Fig. 3. As previously indicated the resistances of various rectifiers, such as the barrier-layer rectifiers, vary appreciably with current density therein, particularly for low current density values.

It is desirable that the copper-oxide rectifiers operate at substantially the same current density values for each of the sensitivity ranges of the gauge. Such operation may be effected by suitable adjustments of the magnetic circuits of the gauge. For example, each of the magnetic legs 4 and 5 may be provided with an adjustable pole face similar to that disclosed in Fig. 4.

Referring to Fig. 4, a magnetic leg 70 is illustrated which corresponds to one of the legs 4 and 5 of Figs. 1 and 3. This magnetic leg 70 is provided with an adjustable pole piece 71 which may be secured to a magnetic screw 72. The screw 72 is received in a threaded opening provided in the leg 70.

By manipulation of the screw 72, the air gap between the pole piece 71 and the armature 6 may be adjusted. When the sensitivity of the gauge device is changed, the pole piece on each leg of the gauge head may be adjusted to provide the desired current density values in the rectifiers. For an increase in sensitivity, each movable pole piece is adjusted to decrease the air gap between the pole piece and the armature 6, and the voltage applied to the winding 30 is adjusted to the desired new value.

A somewhat simpler adjustment of the current densities may be effected by providing each gauge device with a plurality of interchangeable armatures. As shown in Fig. 3, the armature 6 may be detachably secured to the member 7 by means of machine screws 73. Each gauge device includes a plurality of accurately dimensioned armatures 6, 6a, 6b (Fig. 5), each having a length suitable for assuring predetermined current density values in the rectifiers for a predetermined sensitivity setting of the gauge device. When the sensitivity of the gauge device is changed, the appropriate armature is mounted on the member 7. For the purpose of illustration the variations in lengths of the armatures 6, 6a and 6b are exaggerated in Fig. 5.

For satisfactorily operating the measuring instrument 63, a reasonably large power output from the rectifiers is desirable. On the other hand, it is preferable that magnetic flux values in the magnetic core 2 be low. This is for the reason that a large magnetic flux value produces a substantial force on the armature 6 which requires stiff springs 8 and 9 to retain the armature in position. Stiff springs result in excessive gauge pin pressure and such pressure may deform certain classes of work materials.

Furthermore, the large magnetic fluxes require a large magnetic core. This increases the size and weight of the gauge. For these and other reasons low magnetic flux values are desirable.

The voltage induced in each of the windings 34 and 35 forces current through the inductive leakage reactance of the associated winding. In a practicable gauge device this leakage reactance may represent a major proportion of the impedance offered to the current. Substantial reduction in this impedance may be effected by employing a capacitive reactance for neutralizing the aforesaid inductive reactance.

Referring to Fig. 3, a capacitor 75 is connected in series with each of the windings 34 and 35. The capacitive reactance of each of the capacitors 75 is designed to compensate substantially for the inductive reactance represented by the leakage reactance of the associated winding 34 or 35.

It should be observed that the gauge device illustrated in Fig. 3 is desirable even though the capacitors 75 are omitted. The inclusion of the capacitors is preferred, however, for the reasons previously set forth.

If desired, a capacitor 76 may be employed for the winding 30 as shown in Fig. 3. This capacitor together with resistance in circuit therewith, if necessary, serves to filter undesired harmonics from the energy supplied to the gauge device.

Although the invention has been described with reference to certain specific embodiments thereof, numerous modifications of the invention are possible. Therefore, the invention is to be restricted only by the appended claims when interpreted in view of the prior art.

We claim as our invention:

1. In an electrical measuring system for a gauge device including a gauge head having a movable member, and means producing a first alternating electrical quantity increasing with movement of said movable member in a first direction and decreasing with movement of said movable member in a second direction; said gauge device also including means producing a second alternating electrical quantity increasing with movement of said movable member in said second direction and decreasing with movement of said movable member in said first direction, said alternating current quantities being equal for an intermediate position of said movable member; a direct current responsive instrument having an element movable in either of two directions in accordance with the polarity of energization of said instrument, said element being moved to an extent dependent on the magnitude of energization of said instrument, a first full-wave rectifier for converting said first electrical quantity into a first direct current quantity varying in magnitude with said first electrical quantity, a second full-wave rectifier for converting said second electrical quantity into a second direct-current quantity varying in magnitude with said second electrical quantity, means connecting the positive output terminal of said first rectifier and the negative output terminal of said second rectifier to a first terminal of said instrument, and means connecting the remaining output terminals of said rectifiers to a second terminal of said instrument.

2. In an electrical measuring system for a gauge device including a magnetic armature member, a magnetic structure providing first and second magnetic paths each including said armature member, said gauge device also including means mounting said armature member for movement relative to said magnetic structure in a first direction to increase the reluctance of said first magnetic path and to decrease simultaneously the reluctance of said second magnetic path, said magnetic structure being movable relative to said magnetic structure in the direction opposite said first direction to increase the reluctance of said second magnetic path and to decrease simultaneously the reluctance of said first magnetic path, said magnetic armature having an intermediate position in its path of movement wherein the reluctances of said magnetic paths are equal; means for applying to each of said magnetic paths the same alternating magnetomotive force, a separate winding associated with each of said magnetic paths, each of said windings having induced therein an alternating voltage dependent on the alternating magnetic flux in the associated magnetic path, separate full-wave rectifier means associated with each of said windings for producing a direct-current output controlled by the voltage induced in the associated one of said windings, and direct-current measuring means differentially responsive to said direct-current outputs over a range corresponding to movement of said magnetic armature on both sides of said intermediate position, and means for adjusting the difference of said direct-current outputs to which said measuring means responds.

3. In an electrical measuring system for a gauge device including a magnetic armature member, a magnetic structure providing first and second magnetic paths each including said armature member, said gauge device also including means mounting said armature member for movement relative to said magnetic structure in a first direction to increase the reluctance of said first magnetic path and to decrease simultaneously the reluctance of said second magnetic path, said magnetic structure being movable relative to said magnetic structure in the direction opposite said first direction to increase the reluctance of said second magnetic path and to decrease simultaneously the reluctance of said first magnetic path, said magnetic armature having an intermediate position in its path of movement wherein the reluctances of said magnetic paths are equal; means for applying to each of said magnetic paths the same alternating magnetomotive force, a separate winding associated with each of said magnetic paths, each of said windings having induced therein an alternating voltage dependent on the alternating magnetic flux in the associated magnetic path, separate full-wave rectifier means associated with each of said windings for producing a direct-current output controlled by the voltage induced in the associated one of said windings, a capacitor connected in circuit with each of said windings for compensating the le. :age inductive reactance thereof, a direct-current measuring instrument having an element displaceable in either of two directions depending on the polarity of the energization applied to the terminals of said instrument, and means connecting each output terminal of one of said rectifier means to an output terminal of opposite polarity of the other of said rectifier means and to a separate terminal of said direct current measuring instrument.

HERBERT T. RIGHTS.
HERSHEL TOOMIM.

REFERENCES CITED

The following references are of record in the file of this patent:

UNITED STATES PATENTS

| Number | Name | Date |
|---|---|---|
| 1,906,551 | De Forest | May 2, 1933 |
| 2,065,951 | Terry | Dec. 29, 1936 |
| 2,078,796 | Greentree | Apr. 27, 1937 |
| 2,111,442 | West | Mar. 15, 1938 |
| 2,210,970 | Bonell | Aug. 13, 1940 |
| 2,240,184 | Hathaway | Apr. 29, 1941 |
| 2,268,956 | Mestas | Jan. 6, 1942 |

FOREIGN PATENTS

| Number | Country | Date |
|---|---|---|
| 442,441 | Great Britain | Feb. 3, 1936 |